United States Patent
Kitamura et al.

[11] 3,773,189
[45] Nov. 20, 1973

[54] PNEUMATICALLY POWERED LOADING UNIT FOR USE WITH AN INDUSTRIAL ROBOT

[76] Inventors: Yoshiaki Kitamura, 607 Hatsutomi, Kanagaya-machi, Higashi-Kalsushika-gun, Chiba-ken; Shigemi Misono, 3-6-8 kenuto, Setagaya-ku, Tokyo, both of Japan

[22] Filed: Oct. 12, 1972

[21] Appl. No.: 296,905

[52] U.S. Cl. ............................. 214/1 BB, 214/1 Q
[51] Int. Cl. ............................................. B66c 1/44
[58] Field of Search ............. 214/1 BB, 1 BT, 1 BD, 214/1 BV, 1 Q

[56] References Cited
UNITED STATES PATENTS
3,543,947  12/1970  Devol ............................. 214/1 BC
3,572,519  3/1971  Terzuka ........................... 214/1 BC

*Primary Examiner*—Gerald M. Forlenza
*Assistant Examiner*—George F. Abraham
*Attorney*—Eric H. Waters et al.

[57] ABSTRACT

A pneumatically-powered loading unit for use with an industrial robot comprises a transfer arm driven pneumatically for effecting a reciprocal movement in a space between a first cylinder which is fixed and hollow and a second cylinder which is rotatable. The transfer arm has a portion engaging with the second cylinder thereby to rotate in response to the rotation of the second cylinder. The loading unit further comprises a manipulator for effecting a gripping movement, thus providing three fundamental movements, reciprocating, rotating and gripping movements with a simple and compact construction.

10 Claims, 3 Drawing Figures

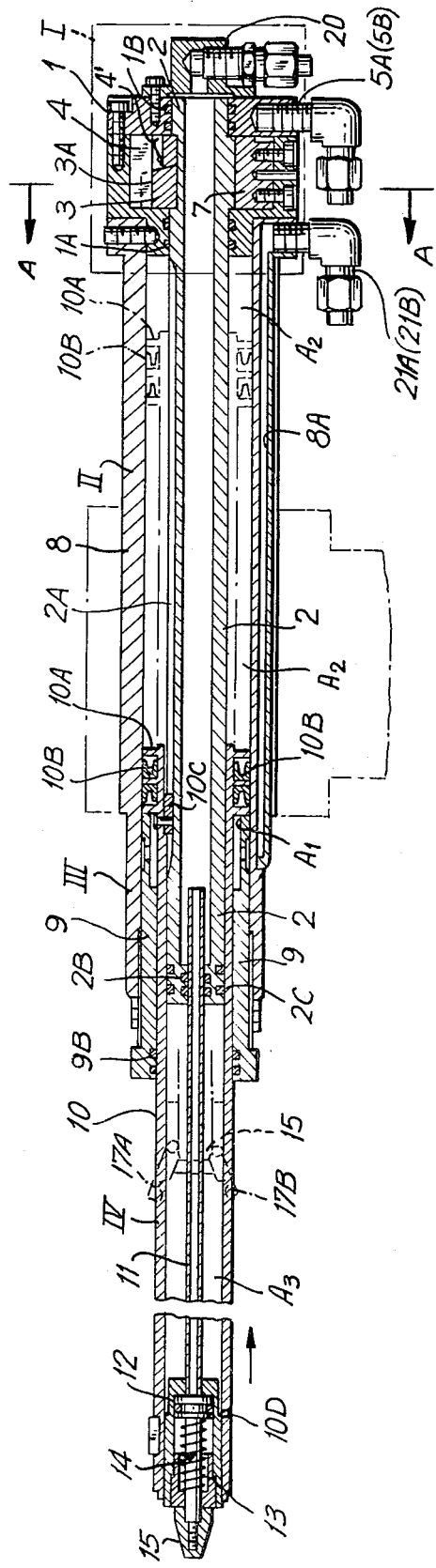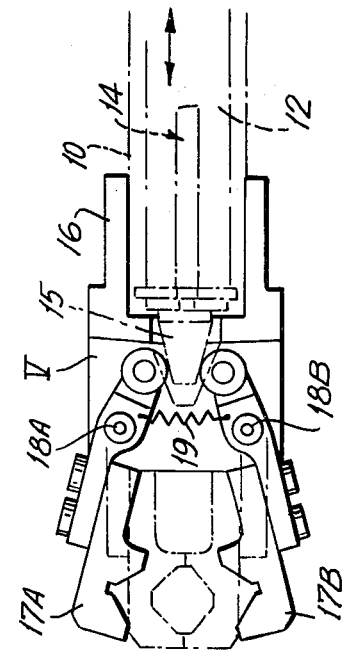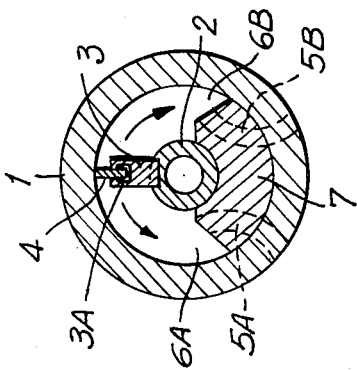

PNEUMATICALLY POWERED LOADING UNIT FOR USE WITH AN INDUSTRIAL ROBOT

BACKGROUND OF THE INVENTION a. Field of the Invention

The present invention relates to a loading unit, and more particularly to a pneumatically- powered loading unit suitable for use as a driving means for an industrial robot.

b. Prior Art

Industrial robots are currently being used in many fields to perform a variety of different operations. In particular, the precision machinery industry has found many uses for industrial robots, including the positioning and transfer of workpieces to different work stations. The use of industrial robots in place of human personnel has proven to be very beneficial and a completely automated processing operation may be carried out thereby reducing costs and eliminating human error.

The industrial robots currently being used employ transfer arms having a manipulator device connected to one end of the arm and an actuator assembly for actuating the transfer arm. The currently available actuator assemblies are generally electrically or hydraulically powered and are disadvantageous in that they provide only a very limited degree and variety of movement and are costly to manufacture.

The electrically powered actuator assemblies have a short useful lifespan due primarily to the heavy loading to which the actuator assembly is subjected. In addition, the electrically powered actuator assemblies cannot effect rapid movement of the transfer arm because of the inherent time lags present in the electric drive motors and associated circuitry and because of the large weight and inertia of the moving parts.

The hydraulically powered actuator assemblies are effective to actuate heavy loads but unfortunately, such assemblies are not applicable for use in the precision machinery industry because of their large size, slow actuating speed and low degree of positional accuracy. Moreover, the hydraulically powered actuator assemblies occupy a relatively large space and have numerous mechanical connections and, therefore are not well suited for use in compact or portable robots.

SUMMARY OF THE INVENTION

It is a primary object of the present invention to provide a loading unit for use with industrial robots comprising a transfer arm and a manipulator.

It is another object of the present invention to provide a load unit for use with an industrial robot for pneumatically effecting horizontal, rotational and gripping movements wherein means for effecting these movements are mechanically coupled together in a compact and portable arrangement.

A pneumatically powered loading unit for use with an industrial robot according to the present invention comprises a first cylinder which is hollow, a second cylinder rotatably disposed coaxially with said first cylinder, a rotary actuator for pneumatically rotating said second cylinder, a transfer arm for effecting a reciprocal movement in a space between said first and second cylinders and having a portion engaging with said second cylinder thereby to rotate in response to the rotation of said second cylinder, and means for pneumatically effecting reciprocal movement of said transfer arm.

A pneumatically powered loading unit according to the present invention further comprises means for effecting a reciprocal movement of a piston in said transfer arm, means for pneumatically operating the latter means, and a manipulator operated in response to the reciprocating movement of said piston means.

BRIEF DESCRIPTION OF THE DRAWINGS

FIG. 1 is a longitudinal cross-sectional view of an embodiment of a loading unit according to the present invention, FIG. 2 is a cross-sectional view taken on line A—A in FIG. 1, and FIG. 3 is an enlarged plan view showing a manipulator portion used in a loading unit according to the present invention.

DETAILED DESCRIPTION OF THE PREFERRED EMBODIMENTS

The loading unit according to the invention comprises a rotary actuator I, a horizontal sleeve unit II, a transfer arm bearing means III, a transfer arm assembly IV, and a manipulator V. The rotary actuator I, as shown in FIGS. 1 and 2, comprises an exterior hollow tube 1 which is circular in cross-section and an interior tubular shaft 2 rotatably supported in airtight manner in bearing means 1A and 1B in the exterior tube 1 coaxially therewith. A vane 3 is secured to the outer surface of the shaft 2, and a vane slider 4 is mounted on the vane 3 with its outer end in airtight contact with the inner surface of the exterior tube 1 and a portion of its inner end slidably received in a slot 3a in the vane 3. A spring 4' acts on vane 3 to urge the outer end into airtight contact with the inner surface of tube 1. This arrangement defines two air chambers 6A and 6B, to which compressed air can be supplied through air supply conduits 5A and 5B. The shaft 2 rotates in either direction depending upon the pressure difference resulting from the supply of the compressed air to the air chamber 6A and 6B. The rotation of the shaft 2 is restricted to predetermined angles by contact of the vane 3 against a central block 7 mounted on the inner surface of the exterior tube 1.

The shaft 2 extends horizontally coaxially within horizontal sleeve 8 secured to the exterior tube 1 and the shaft 2, has bearing means 2c at one end for slidable support of a transfer arm 10 of the transfer arm assembly IV. The transfer arm 10 has at one end a projection 10C and flanged portions 10A between which a packing 10B is provided to assure airtightness, and has at its other end an orifice 10D for discharge or inlet of air as will be described later. The shaft 2 is provided with a guide groove 2A in a central portion of the outer surface thereof. The guide groove 2A extends over a length longer than the length of travel of the transfer arm 10, and serves to guide the projection 10C of the transfer arm 10 to enable horizontal movement in opposite directions relative to the shaft 2. The engagement of projection 10C in the groove 2A causes the transfer arm 10 to rotate in response to rotation of the shaft 2 by means of the rotary actuator I. The transfer arm bearing means III comprises a bearing 9 secured to the inner surface of the horizontal sleeve 8 and having at one end bearing 9B which assists the sliding movement of the transfer arm 10. The transfer arm 10 is disposed coaxially with the shaft 2, the transfer arm 8 and the bearing 9 and slidably supported by these members, thus assuring smooth horizontal movement of the transfer arm in opposite directions.

By this arrangement, an air chamber $A_1$ is formed by the area defined by the inner surface of the horizontal sleeve 8, the inner surface of the bearing 9, and the outer surfaces of the transfer arm 10, and the flanged portion 10A thereof, while another air chamber $A_2$ is similarly formed by the area defined by the inner surface of the sleeve 8, the outer surface of the shaft 2, and the outer surfaces of the flanged portion 10A and the exterior tube 1. The volumes of these air chambers $A_1$ and $A_2$ are changed in complementary relation in response to the displacement of the transfer arm 10. The chambers $A_1$ and $A_2$ are respectively in communication with conduits 21A and 21B which can selectively connect each chamber with compressed air or exhaust. Chamber $A_1$ is shown to be in communication with conduit 21A via groove 8a in sleeve 8 and the chamber $A_2$ communicates with conduit 21B via a similar groove (not shown).

At the left end portion of the transfer arm 10, there is fixed a cylinder 12 including therein a piston 14 having a tapered portion 15 at one end. A spring 13 acts on the piston 14 to bias the latter rightwardly. An inner tube 11 is disposed coaxially within the transfer arm 10 with one end supported by bearing means 2B and with its other end constructed so as to move in the cylinder 12 against the biasing force of the piston 14 and spring 13. Compressed air is supplied from an air supply conduit 20 through the sleeve 8 and the inner tube 11 to the cylinder 12 to displace the piston 14 leftwardly against the force of the spring 13.

An air chamber $A_3$ is formed by the volume defined by the inner surface of the transfer arm 10, the end of the cylinder 12 and the end of the shaft tube 2. The volume of the air chamber $A_3$ varies with the displacement of the transfer arm 10 and air is either introduced into or discharged from the chamber $A_3$ through the orifice 10D for the purpose of buffering the displacement of arm 10.

The manipulator V comprises a manipulator body 16, and a pair of gripping fingers 17A and 17B pivoted about shafts 18A and 18B and biased by a spring 19 which acts to open the fingers 17A and 17B as shown in full lines in FIG. 3. Leftward displacement of the piston 14 causes the tapered portion 15 thereof to enter the gap between the fingers 17A and 17B to cause them to pivot around the shaft 18A and 18B, thus closing the fingers 17A and 17B. In operation, forward and rearward movements (corresponding to leftward and rightward movements in FIG. 1) of the transfer arm 10 is effected as follows: when the compressed air is supplied to the lefthand air chamber $A_1$ through the conduit 21A via the groove 8a in the horizontal sleeve 8, the transfer arm 10 slides rightwardly and enters the sleeve 8 until it strikes against the end of the exterior tube 1. In this case, it should be noted that the air contained in the air chamber $A_3$ is discharged through the orifice 10D because the inner pressure of the air chamber $A_3$ is increased due to the reduction of the volume of the air chamber $A_3$.

The shock normally imparted to the flanged portion 10A at the end of the rightward movement of the transfer arm 10 is absorbed by controlling the outflow of the compressed air. The orifice 10D may be constructed so as to be changeable in diameter in order to further facilitate the control of the outflow of the compressed air.

On the other hand, when air is supplied to the right-hand air chamber $A_2$, the transfer arm 10 slides along the horizontal sleeve 8 from the position shown in dot-dash lines in FIG. 1 to that shown in full lines until the arm 10 strikes against the right end portion of the transfer arm bearing 9. In this case, air flows into the air chamber $A_3$ through the orifice 10D because the pressure in the air chamber $A_3$ is decreased due to the increase of the volume of the air chamber $A_3$. In this case the shock normally imparted to the flanged portion 10A and the transfer arm bearing 9 at the end of the leftward movement of the transfer arm 10 is absorbed by controlling the outflow of the air through the orifice 10D.

The transfer arm 10 can be rotated by means of the rotary actuator I by the following operations.

When compressed air is supplied to the right air-chamber 6B of the actuator I through the air supply conduit 5B (FIG. 2), the shaft 2 is rotated in counterclockwise direction together with the vane body. The projection 10C of the transfer arm 10 is fitted in the groove 2A of the shaft tube 2, so that the transfer arm 10 is rotated in the counterclockwise direction in response to the rotation of the shaft tube 2, thus carrying out any predetermined oscillatory operations.

On the other hand, when the compressed air is supplied to the left air chamber 6A through the air supply conduit 5A, the shaft tube 2 is rotated in clockwise direction thereby to rotate the transfer arm 10 in the clockwise direction in order to carry out the predetermined oscillatory operations.

The gripping movement of the fingers 17A and 17B of the manipulator V is effected as follows:

Compressed air is supplied from the air supply conduit 20 provided on the back end portion of the rotary actuator I through the shaft 2 and the inner tube 11 to the cylinder 12 to raise the pressure in the cylinder 12. Thus the piston 14 is displaced leftwardly to close the fingers 17A and 17B as shown by the dot-dashed lines in FIG. 3. On the other hand, when the compressed air is discharged from the cylinder 12, the piston 14 is returned to its original position by means of the spring 19, thus opening the fingers 17A and 17B as shown in full lines in FIG. 3.

It is to be noted that the reciprocating, rotating and gripping movements of the loading unit can be carried out simultaneously, if desired, to effect more complicated various operations obtained by combination of the three above-mentioned fundamental movements.

As mentioned previously, the loading unit according to the present invention has the many advantages as follows:

1. The simple and compact loading unit can carry out as many as three fundamental movements, i.e., reciprocating, rotating and gripping movements.
2. The shock taking place at the end of the displacing movement of the transfer arm is absorbed by the buffer function of the orifice, thus assuring the smooth movement of the transfer arm.
3. A simply constructed loading unit with lowcost maintenance can be obtained because the loading unit is pneumatically controlled and operated.

What is claimed is:

1. A pneumatically powered loading unit adapted for use with an industrial robot, said unit comprising a first cylinder which is hollow, a second cylinder rotatably disposed in spaced coaxial relation with said first cylinder, a rotary actuator means for pneumatically rotating said second cylinder, a transfer arm supported for sliding movement in opposite directions in the space between said first and second cylinders and also for rotation movement in said space, said transfer arm including a portion engaged with said second cylinder to rotate in response to rotation of said second cylinder, and means for pneumatically effecting sliding movement of said transfer arm in opposite directions.

2. A unit as claimed in claim 1 wherein the transfer arm is hollow, said unit further comprising a piston means supported in the transfer arm for sliding movement in opposite directions, means for pneumatically operating the piston means, and a manipulator coupled to said piston means for being operated thereby.

3. A unit as claimed in claim 2 wherein the transfer arm includes a projection and the first and second cylinders define two chambers one on each side of the projection, the means for pneumatically effecting sliding movement selectively supplying compressed air to said chambers.

4. A unit as claimed in claim 3 wherein said second cylinder and transfer arm define a chamber therebetween which varies in volume as the transfer arm undergoes sliding movement, said transfer arm being provided with an orifice allowing discharge of air from the latter chamber when its volume is being reduced by sliding movement of the transfer arm and for entry of air when its volume is being increased by sliding movement of the transfer arm in opposite direction.

5. A unit as claimed in claim 3 wherein said second cylinder is provided with an external longitudinal groove of a length greater than the length of sliding travel of the transfer arm, said portion of the transfer arm being slidably received in said groove.

6. A unit as claimed in claim 3 wherein said second cylinder is hollow, said means for pneumatically operating the piston means comprising a hollow inner tube secured within said transfer arm and in communication with said piston means, and means for supplying compressed air to said piston means via said second cylinder and said inner tube.

7. A unit as claimed in claim 6 wherein said piston means includes a tapered projecting portion, said manipulator including a pair of pivotal projecting jaws spring biassed to an open position, said projecting portion of the piston means being engageable with said jaws to close the same.

8. A unit as claimed in claim 3 wherein said rotary actuator means comprises a rotary actuator member fixed to said second cylinder, a hollow tube rotatably supporting the actuator member and means defining first and second chambers each having a respective means for supplying compressed air thereto, said first and second chambers being relatively disposed with respect to the actuator member to cause rotation thereof in accordance with the relative pressure in said first and second chambers.

9. A unit as claimed in claim 8 comprising bearing means secured to said first cylinder and supporting the rotary actuator member.

10. A unit as claimed in claim 2 wherein the second cylinder is coaxially mounted within the first cylinder and the transfer arm is coaxial with said cylinders and slidable and rotatable therebetween.

* * * * *